United States Patent Office 3,705,056
Patented Dec. 5, 1972

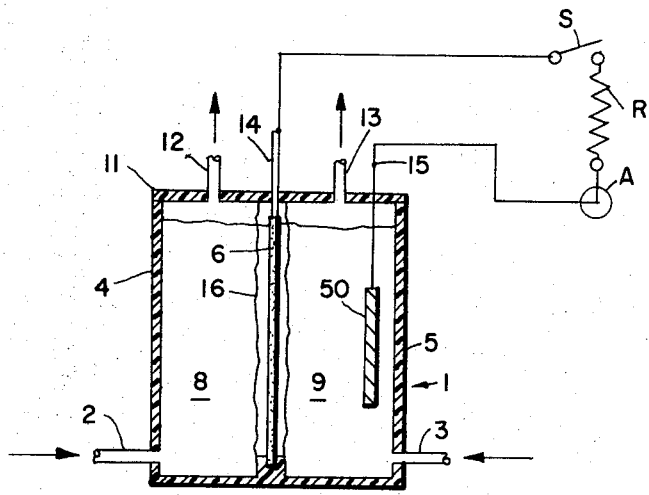
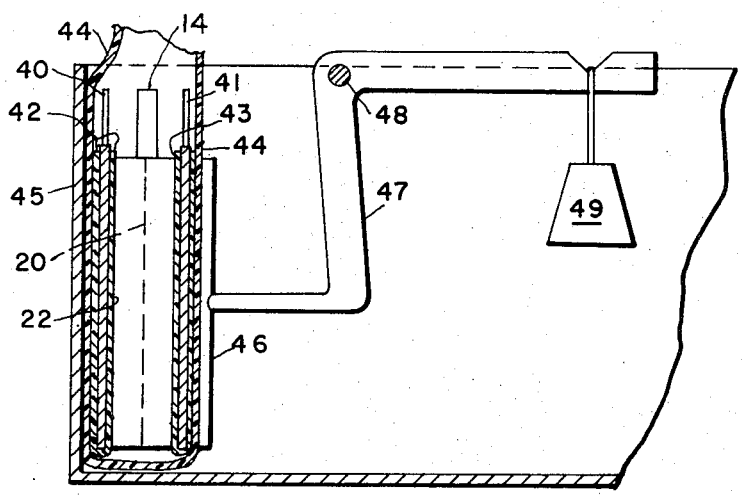
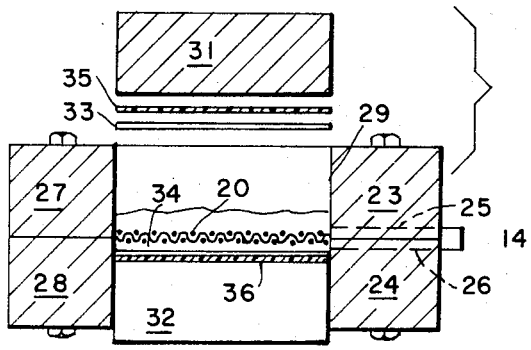

3,705,056
METHOD FOR PRODUCING AND OPERATING A FUEL CELL
Henry P. Doble, Jr., and Harry C. Langelan, Silver Spring, Md., assignors to Decktronic, Inc., Washington, D.C.
Filed Jan. 28, 1969, Ser. No. 794,675
Int. Cl. H01m 13/04, 27/04
U.S. Cl. 136—86 E                8 Claims

ABSTRACT OF THE DISCLOSURE

The invention contemplates a fuel cell having a porous electrode forming the septum between the reducing and oxidizing gas chambers, the electrode comprising a grid pasted with a simple metallic compound such as ferrous oxalate which has been electrolytically reduced while under controlled mechanical pressure to produce a relatively specific, high porosity of extreme surface area.

---

The present invention relates to power cells and is more particularly concerned with a method of producing fuel cells by the electroformation of a cell electrode to provide an extreme of surface area and to permit the incorporation of the electrode as a septum in constructing the cell.

Both fuel cells and porous electrodes have been known for some time. However, certain problems have detracted from the practicality of fuel cells and prevented their wide commercial acceptance.

The control of the so-called "porosity" of an electrode or of a septum, to permit electrolytic contact and gaseous transfer, has been one of the most difficult problems. Prior electrode pasting and forming methods—typically involving "forming by sintering at extreme temperature"—produce an unpredictable number of closed "pores," and more closely resemble a maze or labyrinth with a high percentage of dead-end paths which are essentially useless.

Where "porosity" control has been attempted, it usually results in a reverse loss in efficiency such as by the inclusion of expendable matter which, upon escape, leaves relatively coarse gaps in the formation, and a consequent reduction in the available electrode surface area.

In some instances, a built-up or a composite electrode-septum has been tried, but one or the other or both of the components still remains a limiting factor in terms of fluid permeability or of the electrode surface-area available for contact.

In contrast, the present invention provides a fuel cell having an electrode-septum with an extreme fluid permeability for the electrolyte and the gases, by forming a multitude of interconnecting "pathways" through the porous mass, with closed "pores" being almost non-existent. Of distinct importance is the fact that these pathways are formed by and between crystalline meal fingers which provide an extreme of contact surface area within the porous mass.

In general, the preferred method for forming the cell of the present invention comprises pasting a metal compound upon a metallic grid, forming an electrode by electrolytically reducing to its metallic form the compound of the paste, applying a controlled mechanical pressure to the paste while it is being reduced, exposing the formed electrode to an electrolyte, isolating from each other volumes of electrolyte on opposite sides of the electrode, supplying an electrode to one of the electrolyte volumes, and supplying a reducing gas to the other of said electrolyte volumes.

A better understanding of the invention may be derived from the accompanying drawings and description in which:

FIG. 1 is a sectional side view of the preferred form of cell embodying the invention;

FIG. 2 is a sectional view of preferred apparatus for forming the electrodes according to the invention and greatly enlarged for clarity;

FIG. 3 is a sectional view of a pasting-press assembly;

FIG. 4 is a perspective view, partly cut away, of the porous electrode of FIG. 1.

As shown in the drawings, the preferred form of cell of the invention includes a plastic or non-conductive casing 1 having gas inlets 2 and 3 in opposite side walls 4 and 5. Intermediate the side walls 4 and 5, a porous electrode 6, described more fully hereinafter, is arranged to divide the casing into a pair of chambers 8 and 9.

The casing 1 may be provided with a cover 11, which should be formed of similar plastic or non-conducting material as the casing 1. The cover 11 carries a plurality of apertures therein which provide for discharge tubes 12 and 13 respectively, communicating with the chambers 8 and 9 to control fluid discharge from the chambers where required. The cover 11 also is provided with suitable apertures for receiving electrical connections or tabs 14 and 15 from within the cell.

The porous electrode 6 is sealed in position along its edges against the adjacent walls and cover of the cell by suitable means which are stable under the conditions expected. In test cells, a formed mass of mortician's wax was found suitable in a potassium hydroxide electrolyte.

As best seen in FIG. 4, the porous electrode 6 includes a supporting grid or screen 20 having a connector or lug 14 formed therein and preferably reinforced by a conductive wire insert 21. The screen material may comprise any metal suitable for the service contemplated, such as silver or, for economy, a lead-plated copper screen. Preferably, the lug is protected, in selected areas from corrosion by means of a suitable coating (not shown) of a plastic, such as a polymerized styrene monomer.

Upon grid or screen 20 is formed a permeable, porous mass of a suitable electrode material 22. The method of deposition and formation of this mass 22 is most important in the present invention, and can be best understood with reference to FIGS. 2 and 3 and the following example.

A relatively heavy wire screen of at least 20 strands per inch, such as 40 mesh (Tyler) copper wire cloth, is sized and lugged into a grid by conventional techniques. The weight (A) of the grid is carefully taken, to the nearest milligram, and recorded for purposes of measurement discussed more fully hereinafter. The grid 20 is then wetted in the electrolyte, 15% potassium hydroxide in this case, and freed of excessive electrolyte before being placed in a diepress half 23, FIG. 3.

The diepress half 23 as well as its mating half 24, are provided with mating lug recesses or channels 25 and 26 and with aligned bolt holes 27, 28 respectively, for assembling the halves with the grid therebetween.

Each of the halves 23 and 24 has an aperture 29, 30 respectively, of approximately the same size of the square blade portion of the electrode 6, which in turn is about 1½ inch square, in this example. Slightly tapered press plugs 31 and 32, respectively, are sized to fit closely within the apertures 29 and 30.

PASTING PROCEDURE

One of the plugs—31 for example—is draped with a single ply of facial tissue 33, which serves as a separating agent, and is placed in position in its aperture 29 of press half 23. The assembly is then turned over, to place plug 31 beneath the screen 20.

Powdered ferrous oxalate of approximately 1 micron, particle size, is then tamped uniformly over the upper surface of the screen to a thickness of about ⅛ inch (approximately 2½ grams of powder being required). Approximately 0.6 cc. (18–20 drops) of pasting liquid (15% KOH in this case) is then distributed over the tamped powder surface, which is then covered by a piece of facial tissue 34. A fitted piston 36, preferably of 1/16 inch thick tetrafluoroethylene, is placed over the tissue 34 and the plug 32 is superimposed on the piston.

The assembly is once again turned over; the block 31 and tissue 33 removed, and the procedure is repeated with another 2½ grams of ferrous oxalate and 0.6 cc of pasting liquid. When the block 31 is replaced, over tissue 33 and piston 35, the assembly is placed in a press and the plugs 31, 32 squeezed toward each other with a pressure of about 5000 lbs.

The quality of the press is determined by a visual examination of the reaction of the paste upon disassembly of the press. A slight flow of the paste into the gaps or clearances in the press indicates a good pressing. Conditions of no-flow or of free flow indicate an unsatisfactorily pasted electrode and the need for a complete restart of the procedure.

FORMING PROCEDURE

The properly pasted electrode is carefully placed between sheet electrodes 40 and 41, preferably of nickel, which are covered with insulative covers 42 and 43, respectively, which serve to prevent direct shorts. Unsealed cellophane has been found satisfactory as an insulation for these electrodes.

The assembly of electrodes is next placed into an appropriately sized plastic bag 44 and the package placed against the end wall 45 of the forming apparatus FIG. 2.

A pressure plate 46 is placed against the package, and is in turn engaged by a lever 47, hinged on the apparatus at 48 and actuated by a weight 49. The weight 49 should be adjusted to provide a pressure of 1½ to 2 pounds on the pressure plate 46. A pressure of 1½ pounds is preferred for a 1½ inch square grid, or about 0.66 pound per square inch.

Appropriate electrical connections are then made to establish the pasted grid as a negative cathode in relation to both sheet electrodes as anodes. A potential is applied, in the order of 2.5 volts, with an intended flow of about ¼ amp., providing a current density of about 0.111 amp. per square inch.

The addition of the electrolyte is held until last, in order to prevent liquid breakdown of the paste of the electrode. With the potential already applied to the electrodes, sufficient electrolyte (15% KOH in this example) is added to the plastic bag to fill well above the pasted portion of the grid 6. The plastic bag 44 is not absolutely necessary to this operation, but is considered most advantageous.

The electrochemical reduction is continued for about 18 hours with ¼ amp. at 2.5 volts over the 1½ inch square area of the electrode 6.

After electroforming, the electrode 6 is removed and rinsed in tap water through about 10 changes of water water to draw the residual electrolyte. Phenolphthalein may be used to prove the absence of KOH electrolyte.
be used to prove the absence of KOH electrolyte.

DRYING PROCEDURE

The washed electrode is cleared of excess water, such as by shaking and surface blotting, and is then weighed (C) to the nearest milligram, for purposes of calculation to be discussed hereinafter.

The weighed electrode is then subjected to an evacuating desiccator and dried overnight. After the drying is complete, the desiccator is refilled with an inert gas such as argon. This is critical, since the electrode is now pyrofluoric, by reason of the reduction to ferrous iron in an extremely fine, dendritic crystalline form.

The argon-filled electrode may be weighed (B) in the open, again to the nearest milligram, but is to be stored in the inert argon atmosphere until used.

POROSITY DETERMINATION

During the preparation and forming of the electrode, several weighings were made:

(A) the lugged, dry screen before pasting
(B) the formed and dried electrode
(C) the formed electrode before drying From the above data, we can make several determinations:

(1) B minus A=weight of metal deposit $$\frac{\text{weight of deposit}}{\text{density of the metal}} = \text{volume of the deposited metal } (V_m)$$

(2) C minus B=weight of water in voids ($V_w$)
(3) Adding results in step 1 and step 2 (volume of metal plus volume of water in voids)

$V_m$ and $V_w$=total volume ($V_t$)

(4) Porosity percent=$V_2/V_t$

The desired gross porosity for our electrodes is 82%, as determined above, but may vary within the acceptable range of 77–87%. We have found that such electrode-septums exhibit a peculiarly effective fluid permeability, with a negligible inclusion of closed pores, which makes them suitable for fuel cells without further treatment or the need for the lamination or compositing.

OPERATION OF THE CELL

The porous grid 6 having been installed, as shown in FIG. 1, in a plastic casing or box approximately 1½" wide x 1½" high by 3" long, a 30% solution of KOH is introduced into each of the chambers 8 and 9, and a nickel electrode is installed into the chamber 9. Hydrogen fuel gas is bubbled into the chamber 8 and oxygen bubbled into chamber 9, initiating the fuel cell operation.

Test readings are taken by means of an ammeter A in circuit with a switch S and a 0.002 ohm resistor R, between the electrode connections at 14 and 15. Voltage readings can be taken by any suitable means.

Upon closure of the switch S, a reading of about 50 amperes was indicated, while the voltage was determined to be about 1.1 volts. Fuel gas consumption was 12 cc. per minute of hydrogen, and operation of the cell continued as long as fuel gas and $O_2$ were supplied to the cell. Other fuel gases may be substituted for hydrogen.

It is particularly significant that our cell will operate in this manner at room temperatures, without critical environmental controls so typical of prior fuel cells. Our cell will operate satisfactorily within a range of −30° C. to +55° C.

It is also significant that the cell will operate continuously, without consumption of its electroformed electrode-septum.

The electrode-septum formed according to our invention exhibits a fluid-permeability entirely suitable to permit the required interaction of gases in fuel cells. Further, the minute, often interconnecting, passageways through the porous mass are lined with dendritic protrusions of ferrous iron which provides an extreme of metallic surface area exposed to the electrolyte and gases of the cell.

The permeability of our electrode-septum, which we prefer to measure in terms of gross porosity as discussed hereinbefore, is quite susceptible of regulation. Such regulation is achieved simply by modification of the mechanical pressure applied during the electroforming steps. An increase in pressure from the preferred 0.66 pound per square inch will lower the porosity from the desired 82%, while a decrease in pressure will increase the porosity.

Various changes may be made in the details of the invention as disclosed, without sacrificing any of the ad-

We claim:
1. The method of establishing a fuel cell which comprises:
   (a) pasting a metal cmpound upon a metallic grid,
   (b) forming an electrode by electrolytically reducing the pasted metal compound to its metallic form,
   (c) applying a controlled mechanical pressure to the pasted compound while it is being reduced,
   (d) exposing the formed electrode to an electrolyte,
   (e) isolating from each other volumes of electrolyte on opposite sides of the electrode,
   (f) introducing a second electrode to one of the electrolyte volumes,
   (g) supplying an oxiding gas to one of said electrolyte volumes, and
   (h) supplying a reducing gas to the other of said electrolyte volumes.
2. The method of claim 1 in which the pasted metal compound is an oxalate.
3. The method of claim 1 in which ferrous oxalate is pasted on the metal grid.
4. The method of claim 3 in which the pressure applied during electroreduction is about 0.66 pound per square inch.
5. The method of claim 4 in which the electroreducing current density is about 0.111 amp. per square inch.
6. The method of claim 3 in which the second electrode is nickel.
7. The method of claim 6 in which the electrolyte is potassium hydroxide.
8. The method of claim 7 in which the reducing gas is hydrogen.

References Cited
UNITED STATES PATENTS

| | | | |
|---|---|---|---|
| 3,440,098 | 4/1969 | Stachurski | 136—141 X |
| 3,446,674 | 5/1969 | Giner | 136—86 |
| 3,464,862 | 9/1969 | Perry, Jr. | 136—86 |

FOREIGN PATENTS

| | | | |
|---|---|---|---|
| 508,426 | 12/1954 | Canada | 136—25 |
| 762,108 | 11/1956 | Great Britain | 136—25 |
| 555,441 | 4/1958 | Canada | 136—25 |

OTHER REFERENCES

Watt, Electroplating & Electrorefining of Metal, 1902, TS 670 W34 ep, pp. 444–5.

WINSTON A. DOUGLAS, Primary Examiner

M. J. ANDREWS, Assistant Examiner

U.S. Cl. X.R.

136—120 FC; 204—130